(12) United States Patent
No

(10) Patent No.: US 6,318,686 B1
(45) Date of Patent: Nov. 20, 2001

(54) BRACKET FOR ELECTRIC POLE

(76) Inventor: Keum-Hwan No, 104 -1 Bangseong-Li, Baekseok-Myeon, Yangju-Kun, Kyeunggi-Do, 482-830 (KR)

( * ) Notice: Subject to any disclaimer, the term of this patent is extended or adjusted under 35 U.S.C. 154(b) by 0 days.

(21) Appl. No.: 09/553,753

(22) Filed: Apr. 21, 2000

(51) Int. Cl.$^7$ .................................................. A47B 96/06
(52) U.S. Cl. ........................................ 248/218.4; 248/214
(58) Field of Search ........................... 248/218.4, 220.21, 248/220.22, 214, 227.4

(56) References Cited

U.S. PATENT DOCUMENTS

| | | | |
|---|---|---|---|
| 1,029,207 | * | 6/1912 | Megahan ........................ 174/149 R |
| 1,865,134 | * | 6/1932 | Plimpton ........................... 248/200 |
| 1,896,740 | * | 2/1933 | Cosseboom ....................... 248/214 |
| 3,794,751 | * | 2/1974 | Farmer et al. ................... 174/40 R |
| 3,868,615 | * | 2/1975 | Haibein et al. .................... 337/169 |
| 5,534,858 | | 7/1996 | Tinkham . |
| 6,070,584 | * | 6/2000 | Bergstrom .......................... 128/845 |

FOREIGN PATENT DOCUMENTS

09322699 * 12/1997 (JP) .

* cited by examiner

*Primary Examiner*—Anita King
*Assistant Examiner*—Holly N. Sy
(74) *Attorney, Agent, or Firm*—Dinesh Agarwal, P.C.

(57) ABSTRACT

A bracket for an electric pole includes a fixing part formed to connect with a fixing device installed on an electric pole, a body integrally formed with the fixing part, and a connection pin which is inserted into at least one insertion hole of the body so that it is connected to optional electric members such as a coupling insulator, wherein the bracket installs vertically in the down direction of a fixing device for fixing high-tension wire of an electric pole by the fixing part.

6 Claims, 4 Drawing Sheets

BRACKET FOR ELECTRIC POLE

FIELD OF THE INVENTION

The present invention relates to a bracket for an electric pole which a circuit breaker or a lightning arrester can be mounted thereto, and particularly to a bracket which is vertically fixed to a fixing device for fixing high-tension wire of an electric pole so that it prevents birds from building a nest on the electric pole and accordingly leakage of electricity or stoppage of electric current may be prevented.

BACKGROUND OF THE INVENTION

Generally, a high-tension wire for transferring high-tension power is set over an electric pole placed in outdoor and FIG. 5 shows a conventional telegraph pole in part. In FIG. 5, there is a fixing device 9 which is horizontally installed on an electric pole 10 and a second fixing device 9' under the fixing device 9. The fixing device 9 supports three high-tension wires 11 and the second fixing device 9' is installed with a circuit breaker 12 or a lightning arrester (not shown) which is electrically connected with the high-tension wires 11. The circuit breaker 12 is connected with a transformer 14 placed below thereof so that it may break over-voltage.

Recent times, birds such as magpies and swallows build nests with branches of a tree or pieces of iron wire on electric poles 10 over which high-tension wires 11 are set, especially on the second fixing device 9' that is suitable place to build nests. The pieces of iron wire used for building a nest cause a short circuit by transmitting electricity among the high-tension wires 11 or an interruption of electric power by short circuit.

Accordingly, up to now various devices have been worked out to prevent these accident: a worker removes birds' nests directly, puts a convex cover on the horizontal fixing device in order not to build a nest on an electric pole, or installs shining means by the reflected light of the sun or rotating means such as vane to prevent birds from approaching.

Another device puts a container filled with fluid or emulsion polymer on a fixing device of the electric pole which creates an unpleasant feeling in birds that come around the container, thereby causing them to fly away.

However, birds are used to building a new nest on the same electric pole. Accordingly, there was a problem to repeat removal work that should mobilize lots of manpower and equipments.

Moreover, as time passed, birds build nests again on the electric poles with evading the hinderers installed. Therefore, the fundamental problem can not be solved.

SUMMARY OF THE INVENTION

In view of the drawbacks with the conventional art, the present invention was created to solve those drawbacks and to provide a bracket for an electric pole which prevents an electric leakage or an interruption of electric power due to a birds' nest.

DETAILED DESCRIPTION OF THE INVENTION

Figure 1:
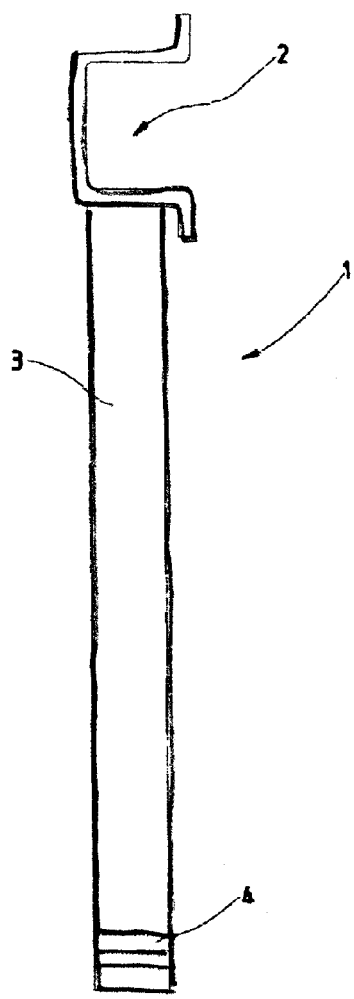
FIG. 1 is a front view showing a bracket for an electric pole according to the first embodiment of this invention.

A bracket for an electric pole according to the present invention includes fixing part 2 formed to connect with a fixing device 9, a body 3 integrally formed with the fixing part 2, and a connection pin 5 which is inserted into an insertion hole 4 formed on the body 3 so that it is connected with a circuit breaker 12 or a lightning arrester 13 through the medium of a coupling insulator 7.

A bracket for an electric pole according to the present invention will be described in detail with respect to a preferred embodiment in combination with the attached drawings. In figures, identical components are represented with identical reference numbers.

Figure 2:
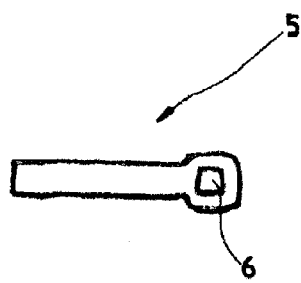
FIG. 2 is a top plan view showing a connection pin that is inserted into an insertion hole of a bracket illustrated in FIG. 1.
Figure 3:
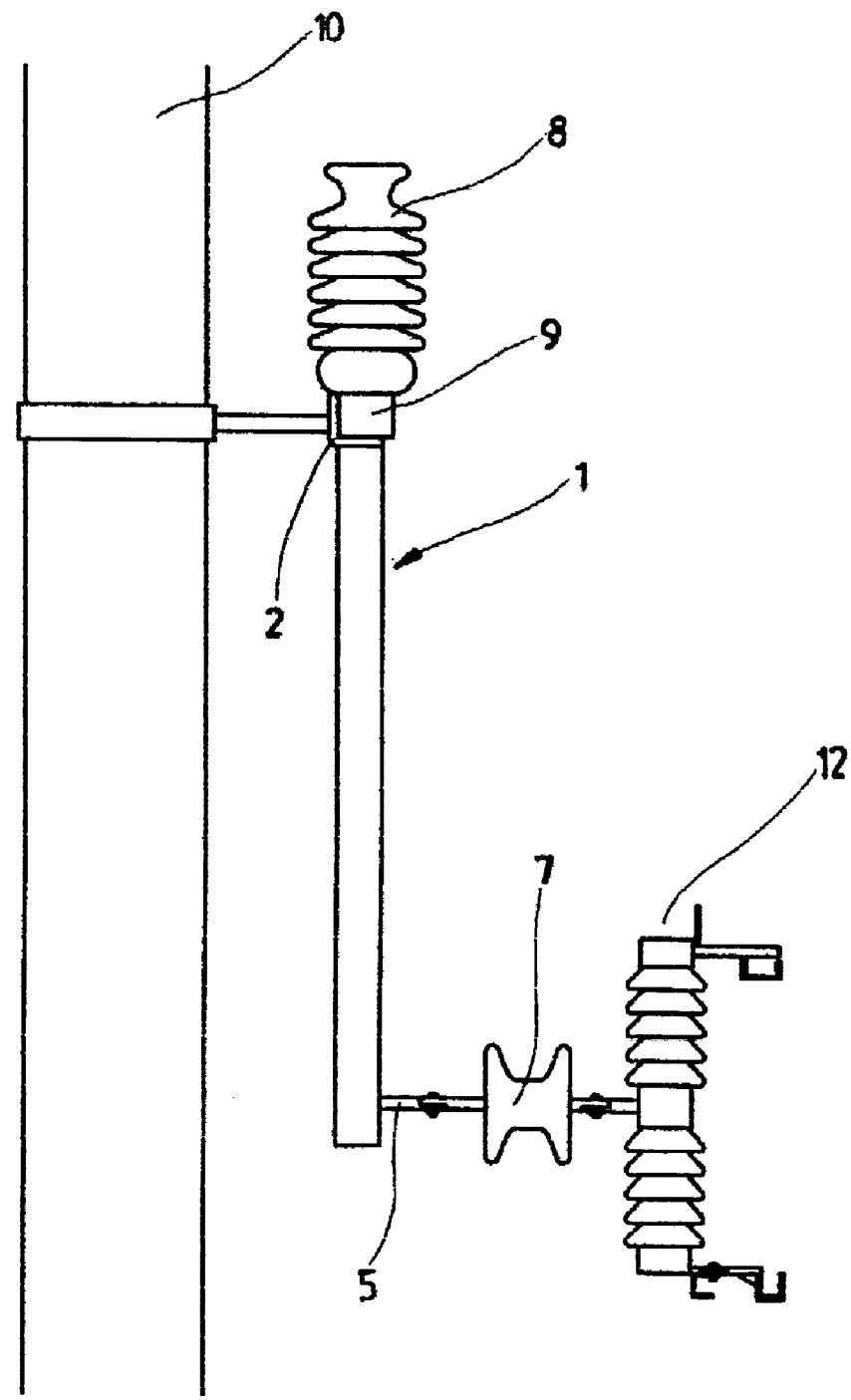
FIG. 3 is a side view showing the condition that a bracket illustrated in FIG. 1 is installed to an electric pole, in part.

FIG. 1 shows the front view of a bracket for an electric pole according to the first embodiment of the present invention, FIG. 2 shows the top plan view of a connection pin inserted into an insertion hole of the bracket, and FIG. 3 shows the side view of the condition that a bracket of FIG. 1 is installed to an electric pole.

A bracket 1 for an electric pole includes fixing part 2 formed to be combined with a fixing device 9 installed on an electric pole 10, a body 3 integrally formed on a side of the fixing part 2, and a connection pin 5 which has corresponding size and figure to the insertion hole 4 to be inserted into the insertion hole 4 formed on the body 3. The connection pin 5 has a connection hole 6 at one end thereof to be able to connect with a circuit breaker 12 or a lightning arrester (13; see FIG. 4) through the medium of a coupling insulator 7 depending on uses.

The fixing part 2 is almost C shaped as shown in FIG. 1 so that a fixing device 9 of an electric pole 10 is inserted there into and then is fixed by fastening means such as a screw or is attached by welding.

While the figure and connecting means of the fixing part 2 were described as above, they are not restricted to these embodiments.

As shown in FIG. 3, a bracket 1 for an electric pole according to the first embodiment of the present invention has only one insertion hole 4 in the lower part of the body 3 and a connection pin 5 is inserted into the insertion hole 4 so that the bracket 1 can be connected to a circuit breaker 12 through the medium of a coupling insulator 7.

Figure 4:
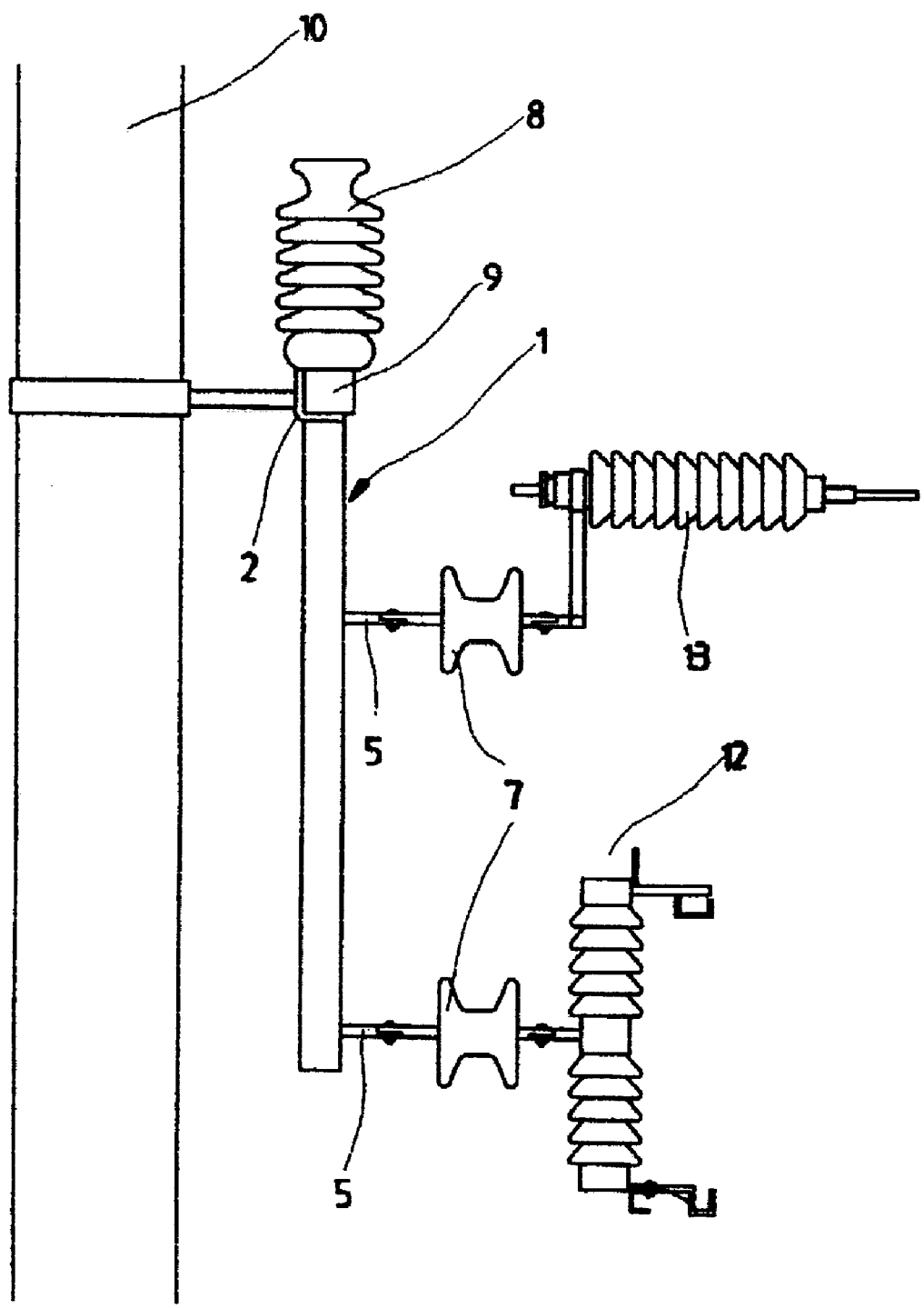
FIG. 4 is a side view showing the condition that a bracket according to the second embodiment of this invention is installed to an electric pole, in part.
Figure 5:
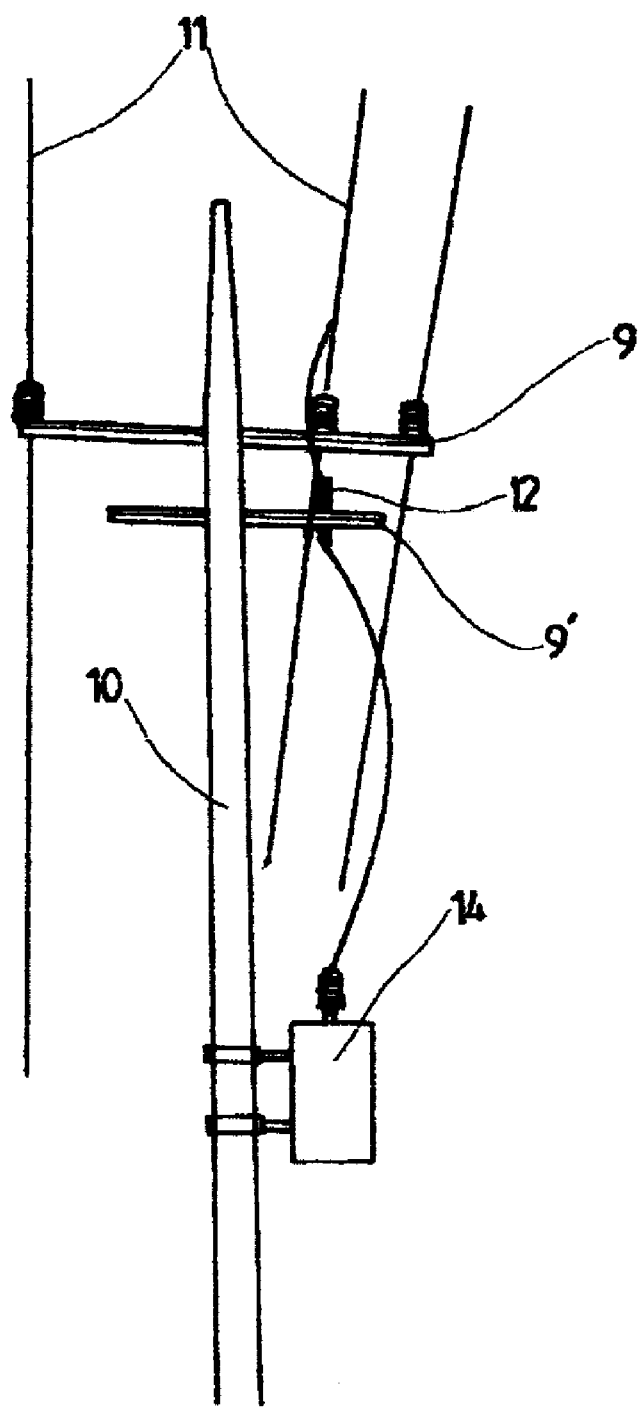
FIG. 5 is a front view showing a conventional telegraph pole.

In addition, the FIG. 4 is the side view showing the bracket installed on an electric pole according to the second embodiment of this invention.

In FIG. 4, the bracket 1 is formed insertion holes 4 in the middle and lower parts respectively so that it can be simultaneously connected with a circuit breaker 12 and a lightning arrester 13 through the medium of a coupling insulator 7 by the insertion pin 5.

As stated above, a bracket 1 for an electric pole according to this invention is fixed to a fixing device 9 of an electric pole by a fixing part 2 in parallel direction to an electric pole 10 and namely, is vertically fixed under an insulator 8 which is for supporting a high-tension wire (now shown). At need, numerous brackets 1 corresponding to the number of high-tension wires may be installed.

Accordingly, the horizontal second fixing device 9' for installation of a circuit breaker 12 or a lightening arrester 13 is not needed anymore, contrary to formal way, and therefore there is no space where birds can build a nest on.

As described above, a bracket of the present invention is vertically fixed in the down direction of a fixing device for fixing high-tension wire of an electric pole and can be set a circular breaker or a lightning arrester thereon. Therefore, the bracket can prevent leakage of electricity or breakdown of electric current caused by a nest since the present invention does not need the parallel second fixing device where birds can build a nest on.

Further, it also has the advantage to cut down on unnecessary expenses for nests-removing work.

It is to be understood that, while the invention was described with respect to some specific embodiments, the invention is never restricted to those embodiments and a variety of modifications and alterations would be possible to a man skilled in the art by referring to the description or drawings presented here and within the spirit of the invention and thus those modifications or alterations are to fall within the scope of the invention, which scope should be limited only by the attached claims.

What is claimed is:

1. A bracket for mounting to an electric pole, the pole including a support member extending horizontally therefrom, the bracket comprising:
   a) an elongated body including top and bottom end portions;
   b) a generally U-shaped fixing member positioned at the top end portion of said body;
   c) the bottom end portion of said body including a first insertion hole;
   d) a first connection pin received in the first insertion hole and including a first connection hole for receiving a first electrical device; and
   e) said U-shaped fixing member for receiving the support member of the pole in a manner so as to align said body generally parallel to the pole.

2. The bracket of claim 1, wherein:
   a) said first connection pin extends generally transversely to and away from said body.

3. The bracket of claim 1, further comprising:
   a) a second insertion hole in the body; and
   b) a second connection pin received in the second insertion hole and including a second connection hole for receiving a second electrical device.

4. The bracket of claim 1, wherein:
   a) said first and second connection pins extend generally transversely to said body and generally parallel to one another.

5. The bracket of claim 4, wherein:
   a) said first and second connection pins extend away from said body.

6. The bracket of claim 4, wherein:
   a) said second connection pin is disposed adjacent the top end portion of said body.

\* \* \* \* \*